Patented Aug. 25, 1942

2,294,140

UNITED STATES PATENT OFFICE 2,294,140

DEODORANT CREAM

Walter A. Taylor, Tamaqua, Pa., assignor to Atlas Powder Company, Wilmington, Del., a corporation of Delaware No Drawing. Application December 13, 1940, Serial No. 369,985

9 Claims. (Cl. 167—90)

The present invention relates to improvements in deodorant cream.

An object of the invention is to provide a cream of this type having improved cosmetic properties and effectiveness.

Another object of the invention is to provide a cream of this type having improved stability and relative freedom from drying out.

A further object is to provide a cream of this type which is less irritating to use than the customary deodorants.

Other objects will become apparent in the course of the following description and claims.

The present invention is concerned with a cosmetic cream designed as a deodorant. It is well known to the art that the active part of a deodorant composition comprises materials which serve to neutralize or mask the odor of perspiration and/or materials which inhibit the normal flow of perspiration by exerting an astringent action on the sweat glands. The first type of ingredient is generally a bactericidal substance which may also have specific properties for absorbing or otherwise destroying the odor of perspiration as distinguished from a substance which merely adds an overpowering scent to mask the first odor. The second type of deodorant material is selected for its specific astringent properties. A number of the deodorant compositions have both perspiration masking and perspiration inhibiting functions obtained by the selection of a proper ingredient or by mixing two or more different ingredients. Among the ingredients commonly employed in deodorant compositions are alum, aluminum acetate, aluminum aceto-tartrate, aluminum citrate, aluminum chloride, aluminum sulfate, aluminum subgallate, benzoic acid, salicylic acid, chloral hydrate, sodium perborate, calcium hypochlorite, calcium borate, tantalum, tannoform, zinc oxide, zinc stearate, zinc salicylate, zinc sulfate, quinine, formaldehyde, para-formaldehyde, menthol, betanaphthol, resorcinol, a mixture of 33.5% resorcinol and 66.5% ethyl salicylate, salol, thymol, boric acid, chromic acid, tannic acid, trichloroacetic acid, tartaric acid, potassium permanganate, hydrogen peroxide, bismuth subnitrate, bismuth subgallate, iron salts, etc. Most of the commonly used ingredients have to some degree a tendency to irritate the skin.

The deodorant compounds can be applied in a variety of ways but because of their tendency to produce skin irritation it has become more popular to combine the deodorant ingredient with an emollient cream. Such combinations in the past have been subject to numerous defects. In the first place, the compounds used tend to break emulsions and many emulsifiers are unstable in their presence. The creams would, therefore, separate in time into an aqueous layer and an oil layer.

In the past the emulsified deodorant creams were of the oil-in-water type. Whenever possible it is advantageous to have the deodorant in a dissolved state, water-soluble ingredients being in the aqueous phase of the emulsion, and oil-soluble ingredients being in the oil phase. Particularly in the case of astringent antiperspirants is this desirable because of the improved penetration and rapidity of action obtained. Where a water-soluble astringent was used in an emulsion of the oil-in-water type this meant that the astringent solution was the continuous phase and was subject to evaporation and crystallization. The effect of crystallization is so pronounced that samples of these creams often contain crystals of easily visible size which are sharp and highly irritating when rubbed into the skin. Much of the irritation of these deodorant creams may be attributed to mechanical scratching of the skin due to friction with crystals.

Another result of the drying out of the aqueous phase in the prior art creams of the oil-in-water type is that the product thereby loses the feel of a cream, the surface of the product becoming hard and cracking open thereby becoming unsightly and unmerchantable.

The present invention provides a deodorant cream which is free from these defects. My cream is stable due to the use of a novel emulsifier. The cream is furthermore of the water-in-oil type whereby the aqueous portion is the internal phase of the emulsion and drying out is inhibited to a very large extent. The cream of my invention has a smooth cosmetic feel and is non-irritating to apply due to freedom from crystals. Furthermore, the cream leaves a thin, emollient, oily film on the skin after application. Because the deodorant is maintained in dissolved condition it is faster and more uniform acting than it is in the case where crystallization has occurred.

My deodorant cream comprises one or more of the usual oily or fatty substances employed in making cosmetic creams. For example, I may use one or more of stearic acid, lanolin, beeswax, petrolatum, ceresin wax and the like. The oily or fatty material comprises the oil phase of the cream. If the cream is to contain an oil-soluble deodorant or other oil-soluble ingredient it will also be included in the oil phase. The aqueous phase of the cream comprises water or a solution of any water-soluble deodorant or other ingredient present. The oil and water phases are emulsified with the aid of an emulsifier to be described hereinafter.

In addition to these two types of materials, the creams will generally contain one or more fillers such as talc, starch, kaolin, zinc oxide and the like which act to improve feel and in some cases to absorb perspiration. Perfume can be added if desired and likewise suitable coloring matters. The consistency of the cream can be varied in accordance with usual cosmetic practice by changing the amounts of waxes and/or fillers.

The emulsifier employed in my invention is of the type described and claimed in the copending application of Kenneth R. Brown, Serial No. 341,903, filed June 22, 1940. Emulsions containing electrolytes and prepared with these emulsifiers are described and claimed broadly in the copending application of Kenneth R. Brown, Serial No. 353,921, filed August 23, 1940.

Compounds of the type contemplated for use as emulsifiers in the emulsions of the present invention are described in detail and claimed in the said copending application, Serial No. 341,903, to which reference should be had for details of chemical structure, methods of preparation, sources of materials, etc., it being understood that the emulsifiers of the present invention include all of the compositions of said earlier application. For the purposes of the present invention, it will suffice to say that the emulsifiers are esterified polyhydroxylic materials of the types: cyclic inner ethers of hexitols, particularly the hexides; or mixtures of cyclic inner ether of hexitols with cyclic inner ethers of hexane pentols; or external ethers or polymeric ethers of these materials, in which "polymeric" includes dimeric and further includes external ethers formed of identical or different inner ether units; or mixtures of two or more of the foregoing. These ethers can be prepared from the parent hexitols or mixtures thereof with hexane pentols and the ethers then esterified, but preferably the fatty acid and the parent polyhydric alcohol are reacted together under conditions producing etherification of the alcohols and also esters of the ethers. Pure polyhydric alcohols can be used if desired, but, particularly in the case of sorbitol, commercially available mixtures are suitable and, in many cases, are preferable to the purer products. Sorbitol syrups of the grade known as "technical," such as can be obtained, for example, by the electrolytic reduction of glucose are satisfactory, these syrups comprising sorbitol together with hexane pentols.

The fatty acid which enters into the formation of the emulsifiers is preferably one having six or more carbon atoms, especially the acids found in the natural esters of animal and vegetable oils and fats, although synthetically produced acids, such as margaric, can be used.

I have found that the most desirable emulsifiers are obtained when the reaction is so conducted that on an average the hydroxyl and ester values of the resulting product are substantially those corresponding to a hexide monoester. In this case the ratio of the hydroxyl value to the ester value is one, that is:

$$\frac{\text{Hydroxyl value}}{\text{Ester value}} = \frac{\text{grams KOH equivalent to hydroxyl}}{\text{grams KOH equivalent to combined acid}} = \frac{1 \text{ equivalent KOH}}{1 \text{ equivalent KOH}} = 1$$

Due to the incidence of side reactions, the use of mixed polyhydroxylic materials and also the use of mixed acids from natural sources, the range of useful products contemplated by my invention will be found to have values for the ratio of hydroxyl to ester of from 2.0 to 0.5.

Since, when using stoichiometric proportions, the initial ratio of acid equivalent to carbon atoms of the polyhydroxylic material is $\frac{1}{6}$, and since the etherification and esterification processes involve only the loss of water with no loss of carbon, the ratio of acid equivalents to atoms of polyhydric residue carbon in the product is still $\frac{1}{6}$, regardless of the extent of internal or external etherification. While the preferred ratio of acid equivalents to polyhydroxylic carbon atoms is $\frac{1}{6}$ or 0.166, useful products may be obtained having ratios of somewhat less than 0.16, preferably not below about 0.15, and also ratios somewhat higher than 0.16, preferably not over 0.25.

Instead of starting with the hexitols or mixed polyhydric alcohols, the emulsifiers can be made from preformed monoanhydrides of hexitols (hexitans) or dianhydrides of hexitols (hexides) or anhydrides of hexane pentols. For example, when starting with the hexides, the esterification can be conducted under non-etherifying conditions such as by using the acid chloride and pyridine, or any other suitable base, to neutralize the hydrochloric acid, formed in the reaction, or the acid anhydride may be used in place of the acid chloride. Esterifying a hexide in this manner gives largely monomeric hexide esters. Also, hexitols or mixtures thereof comprising hexane pentols may be reacted with mineral acids, or under etherifying conditions, in the absence of organic acid, the resulting mixtures of mono- and polymeric inner ethers thus obtained purified with decolorizing carbon or other methods, and then the resulting mixture of hydroxylic ethers esterified with fatty acid under non-etherifying conditions.

The following examples from application, Serial No. 341,903 are set out to illustrate the preparation of some of the emulsifiers that can be used in making the emusions of the present invention.

Example 1

182 g., dry basis, of technical sorbitol syrup, with solids comprising about 80% sorbitol and the remainder non-sorbitol polyhydroxylic materials, largely hexane pentols, were placed in a flask and adjusted to a pH of 2.0 by the addition of 2.0 cc. of 85% $H_3PO_4$. To the resulting material were added 216 g. of distilled coconut oil fatty acids having an acid number of 275 and containing approximately 60% of lauric acid. This quantity of coconut oil fatty acid was 1.054 times the equivalent weight of fatty acid, the 5.4% excess of acid being used to compensate for acids distilled during the reaction. The reactants were heated together with agitation in an inert atmosphere of carbon dioxide for a total of two and one-half hours at 225° C. The reaction mixture had become uniformly clear in appearance after two hours at 225° C. and was then given a decolorizing treatment with a commercial activated carbon known as "Darco G-60". This treatment consisted in adding 2% Darco based on the total weight of the charge during the last half-hour of the heating at 225° C. The mixture was subsequently filtered free of carbon.

The product was an oily liquid having the following properties:

| | |
|---|---|
| Hydroxyl value | 205 |
| Ester value | 170 |
| Viscosity at 25° C centipoises | 439 |

The product was largely composed of the sorbide monoesters of coconut oil fatty acids together with small amounts of sorbitan esters and other ether-esters. It was a reddish yellow oil having a color of 60 units when read on a Hess-Ives tint photometer using a 6 mm. cell.

This material proved especially useful in the preparation of emulsions made in the presence of electrolytes such as water-in-oil emulsions where aluminum chloride or aluminum sulfate was present in the emulsion mixture, and oil-in-water emulsions containing electrolytes such as citric acid.

Example 2

3185 g. (17.5 mols) technical sorbitol syrup (of the type used in Example 1) measured on a dry basis were adjusted to a pH of 2.0 by the addition of 24 cc. 85% $H_3PO_4$. This syrup was then reacted with 4970 g. (about 17.5 mols) of triple-pressed stearic acid in an inert atmosphere of carbon dioxide for three hours twenty-five minutes at 245° C. The product was treated with 2% of its weight of activated carbon (Darco G-60) for one-half hour at 200° C. and subsequently filtered free of carbon. It was then deodorized for two hours at 140° C. by means of superheated steam and subjected to a second 2% Darco treatment. The final product had a color of 89 units as measured in a 6 mm. Hess-Ives tint photometer cell, and the following analytical values:

| | |
|---|---|
| Acid number | 4.5 |
| Hydroxyl value | 218 |
| Ester value | 135.5 |
| Melting point °C | 42–43 |

The ester portion was composed principally of sorbide monoesters of triple-pressed stearic acid and the remainder of sorbitan and other ether-esters of triple-pressed stearic acid.

Example 3

114 g. (about 0.5 mol) of commercial myristic acid and 91 g., dry basis, (0.5 mol) technical sorbitol syrup (as in Example 1) which had been adjusted to a pH of 1.8 by the addition of $H_3PO_4$ were reacted for a period of one hour at 210° C. The reaction mixture was given an additional half-hour heating treatment at 210° C. in the presence of 2% Darco G-60 decolorizing carbon and was subsequently free of the carbon. The product had a color of 60 Hess-Ives units as read directly in a 6 mm. Hess-Ives tint photometer cell. The product had the following analytical values:

| | |
|---|---|
| Acid number | 6 |
| Hydroxyl value | 180 |
| Ester value | 161 |

The product comprising principally sorbide monomyristate was an excellent emulsifier. A 1% solution of the myristate in corn oil reduced the interfacial tension between this corn oil and water from 22.2 dynes/cm. to 2.6 dynes/cm.

Example 4

335 g. distilled coconut oil fatty acids were reacted with 285 g. mannitol in the presence of 1.71 cc. 85% $H_3PO_4$ for a total of two and one-quarter hours at 235° C. During the last half-hour at 235° C. the reaction mixture was given a Darco G-60 decolorizing treatment employing 2% Darco based upon the reactant weight. The reaction mixture was cooled to 180° C. and filtered free of carbon. The product was a reddish oil having a color of 70 Hess-Ives units as measured directly in a 6 mm. Hess-Ives tint photometer cell and had the following analytical values:

| | |
|---|---|
| Acid number | 5 |
| Hydroxyl value | 180 |
| Ester value | 165 |

The product was composed chiefly of the mannide monoesters of the distilled acids derivable from coconut oil.

Example 5

378 g. (about one and one-third mols) triple-pressed stearic acid were reacted with 242 g. (about one and one-third mols) mannitol in the presence of 0.55 cc. 85% $H_3PO_4$ for a total of four hours at 245° C. During the last half-hour at 245° C. the reaction mixture was given a 2% Darco G-60 decolorizing carbon treatment. The product was cooled to 180° C. and filtered free of carbon. The product was a yellow solid having the following analytical values:

| | |
|---|---|
| Acid number | 4 |
| Hydroxyl value | 170 |
| Ester value | 138 |
| Melting point °C | 41–42 |

Example 6

438 g. of white olein, representing about 1.5 mols oleic acid, were reacted with 273 g. (1.5 mols) mannitol in the presence of 1.64 cc. 85% $H_3PO_4$. The reaction was carried out in a glass flask equipped with an agitator, a carbon dioxide inlet tube to permit the use of an inert atmosphere and an inverted U air condenser. The reactants were heated with agitation in an inert atmosphere of carbon dioxide for one and one-half hours at 220–225° C. after which time the reaction mixture became uniformly clear in appearance. The product was given a 2% Darco G-60 treatment at this time and the heating continued for an additional half-hour at 220–225° C. The product was filtered free of carbon. It was a reddish yellow oil having a color of 130 Hess-Ives units as measured directly in a 6 mm. Hess-Ives tint photometer cell and having the following analytical values:

| | |
|---|---|
| Acid number | 7 |
| Hydroxyl value | 150 |
| Ester value | 145 |
| Viscosity at 25° C centipoises | 1200 |

The product was composed chiefly of mannide monooleate.

The creams of the present invention can be prepared from suitable oily material, deodorant, water and other ingredients by emulsification in accordance with usual practiced methods using an emulsifier of the type described. Typical examples of the creams of the present invention are set out below but it is to be understood that my invention is not restricted to the details thereof.

*Example 7*

2 g. of the product of Example 4 were dissolved in a mixture of 28 g. petrolatum and 10 g. beeswax at 70° C. 20 g. aluminum chloride (hydrated) were dissolved in 40 g. water and the solution heated to 70° C. The solution of aluminum chloride was added to the petrolatum mix and the mixture stirred mechanically until it had cooled to room temperature. The resulting emulsion was of the water-in-oil type and was very useful as a perspiration inhibitor and astringent.

If desired, the beeswax in the above emulsion may be replaced by paraffin wax, or may be replaced by the use of additional quantities of petrolatum.

*Example 8*

28 parts of petrolatum and 10 parts of beeswax are melted together at 70° C. and 2 parts of the product of Example 6 stirred into the mix. A solution is made up with 20 parts aluminum sulfate in 40 parts water and heated to 70° C. The aluminum sulfate in solution is added slowly to the mix first prepared while constantly stirring the latter. Stirring is continued until the resulting emulsion cools to room temperature. The emulsion is of the water-in-oil type and is stable even after long standing. Such an emulsion is useful as an anti-perspirant.

*Example 9*

An oil phase is prepared by melting together 28 parts petrolatum, 10 parts beeswax, and 2 parts of the product of Example 1. The oil phase is maintained at 70° C. and a solution of 20 parts sodium alum in 40 parts water at 70° C. slowly added with continuous stirring. The stirring is continued until the emulsion cools to room temperature. A stable water-in-oil emulsion results which is useful as an astringent skin cream.

Instead of sodium alum in this cream a similar product can be prepared using potassium alum.

A base was made up with the following ingredients:

| Ingredients: | Percentage by weight |
|---|---|
| Emulsifier of Example 6 | 5 |
| Ceresin wax (melting point 156–160° F.) | 15 |
| Petrolatum | 20 |
| Mineral oil U. S. P. 65–70° Saybolt | 50 |
| Lanolin (anhydrous) | 10 |

The above ingredients are melted and mixed together.

The aqueous phase was made up of a solution of 10 parts aluminum citrate in 35 parts water. To improve heat stability the solution has added thereto 0.2% $MgSO_4.7H_2O$ based on the total composition.

In making up the emulsion both the water and the oil phases are separately heated to a temperature of about 60–65° C. and the aqueous phase is then added to the oil phase with constant stirring. 35% of the base described were emulsified with 10% aluminum citrate in 35% water and 20% talc added. After incorporation is complete, the emulsion is preferably homogenized at 50–60° C. and filled into jars while hot.

The above examples are illustrative only. Commercial products nearly always contain a perfume which is generally selected to serve to cover the odor of perspiration, and may be added to any preparations within the claims of this patent without altering the essential properties thereof. This, however, is a detail well within the skill of those versed in this art.

The products of the above examples and others according to the invention are emulsions of the water-in-oil type. The deodorant is kept in solution and the water is substantially kept from evaporation by the surrounding oil phase. Furthermore, the creams feel smooth and leave a film of emollient fat or oil on the skin to counteract any irritant action of the deodorant. Prolonged storage tests have proved that the creams of the invention are stable under a wide range of temperature and humidity conditions.

The invention is to be taken as limited only by the scope of the following claims.

I claim:

1. A deodorant cream of the water-in-oil type comprising an oil phase, an aqueous phase, a deodorant, and an emulsifier comprising a hexide monoester of a fatty acid with at least 6 carbon atoms.

2. A deodorant cream of the water-in-oil type comprising an oil phase, an aqueous phase, a perspiration retarding astringent in said aqueous phase, and an emulsifier comprising a hexide monoester of a fatty acid with at least 6 carbon atoms.

3. A deodorant cream as in claim 2 wherein the astringent is an aluminum compound.

4. A deodorant cream of the water-in-oil type comprising an oil phase, an aqueous phase, a deodorant, and an emulsifier consisting essentially of a mixture of hexide monoester of a fatty acid having at least 6 carbon atoms and the other esters produced in the reaction of a polyhydroxylic material selected from the group consisting of hexitols, hexitans, and mixtures of hexitols and hexane pentols, with the said fatty acid with at least 6 carbon atoms at elevated temperatures and in the presence of an acidic catalyst, said mixture having a ratio of fatty acid equivalents to carbon atoms of polyhydroxylic residue of from about 0.15 to 0.25, and the ratio of hydroxyl value to ester value of said mixture being from about 0.5 to 2.0.

5. A deodorant cream as in claim 4 wherein the said polyhydroxylic material is mannitol and the said fatty acid is oleic acid.

6. A deodorant cream of the water-in-oil type comprising an oil phase, an aqueous phase, a perspiration retarding astringent in the aqueous phase, and an emulsifier consisting essentially of a mixture of hexide monoester of a fatty acid having at least 6 carbon atoms and the other esters produced in the reaction of a polyhydroxylic material selected from the group consisting of hexitols, hexitans, and mixtures of hexitols and hexane pentols, with the said fatty acid with at least 6 carbon atoms at elevated temperatures and in the presence of an acidic catalyst, said mixture having a ratio of fatty acid equivalents to carbon atoms of polyhydroxylic residue of from about 0.15 to 0.25, and the ratio of hydroxyl value to ester value of said mixture being from about 0.5 to 2.0.

7. A deodorant cream as in claim 6 wherein the said polyhydroxylic material is mannitol and the said fatty acid is oleic acid.

8. A deodorant cream as in claim 6 wherein the said astringent is an aluminum compound.

9. A deodorant cream of the water-in-oil type comprising an oil phase, an aqueous phase, an aluminum compound capable of retarding perspiration in said aqueous phase, and an emulsifier consisting essentially of a mixture of mannide monooleate and the other esters produced in the reaction of mannitol and oleic acid at elevated temperature and in the presence of an acidic catalyst, said mixtures having a ratio of oleic acid equivalents to carbon atoms of mannitol residue of from about 0.15 to 0.25, and the ratio of hydroxyl value to ester value of said mixture being from about 0.5 to 2.0.

WALTER A. TAYLOR.